United States Patent
Terada et al.

(10) Patent No.: US 10,065,581 B2
(45) Date of Patent: Sep. 4, 2018

(54) VEHICLE PILLAR STRUCTURE

(71) Applicant: TOYOTA JIDOSHA KABUSHIKI KAISHA, Toyota-shi (JP)

(72) Inventors: Shin Terada, Toyota (JP); Yoshinori Yamada, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 59 days.

(21) Appl. No.: 15/403,282

(22) Filed: Jan. 11, 2017

(65) Prior Publication Data

US 2017/0240122 A1    Aug. 24, 2017

(30) Foreign Application Priority Data

Feb. 22, 2016    (JP) ................. 2016-030974

(51) Int. Cl.
*B60J 7/00* (2006.01)
*B60R 13/08* (2006.01)
*B62D 25/04* (2006.01)
*B62D 29/04* (2006.01)
*G02B 5/20* (2006.01)

(52) U.S. Cl.
CPC .............. *B60R 13/08* (2013.01); *B62D 25/04* (2013.01); *B62D 29/043* (2013.01); *G02B 5/208* (2013.01); *B60Y 2410/114* (2013.01)

(58) Field of Classification Search
CPC .... B62D 25/04; B01D 29/012; B01D 29/111; B60J 10/30; B60J 10/80; B60J 5/06; B60R 2021/0006; B60R 22/203; B60R 22/24

USPC ..................................... 296/193.06
See application file for complete search history.

(56) References Cited

U.S. PATENT DOCUMENTS

| | | | | |
|---|---|---|---|---|
| 6,428,087 B1* | 8/2002 | Frasher | ................ | B60R 21/04 296/146.1 |
| 6,467,834 B1* | 10/2002 | Barz | ................ | B62D 25/04 296/187.02 |
| 6,702,368 B1 | 3/2004 | Hanyu | | |
| 6,854,786 B2* | 2/2005 | Berglund | ................ | B60R 13/04 296/146.9 |
| 2004/0104598 A1* | 6/2004 | Barz | ................ | B62D 25/04 296/187.02 |

(Continued)

FOREIGN PATENT DOCUMENTS

| JP | 9-95807 A | 4/1997 |
|---|---|---|
| JP | 2003-205659 A | 7/2003 |

(Continued)

OTHER PUBLICATIONS

U.S. Appl. No. 15/340,280, filed Nov. 1, 2016, Masaru Toyota, et al.

*Primary Examiner* — Kiran B Patel
(74) *Attorney, Agent, or Firm* — Oblon, McClelland, Maier & Neustadt, L.L.P.

(57) ABSTRACT

A vehicle pillar structure comprising: a pillar member configuring a skeleton of a vehicle; a reinforcement member disposed inside the pillar member, bridging a pair of side portions of the pillar member, and reinforcing the pillar member; and an infrared transmission inhibition member, the infrared transmission inhibition member covering the reinforcement member at least from a design surface side of the pillar member and inhibiting transmission of infrared radiation.

7 Claims, 8 Drawing Sheets

(56) References Cited

U.S. PATENT DOCUMENTS

| | | | |
|---|---|---|---|
| 2007/0194604 A1* | 8/2007 | Nygaard | B60R 21/13 296/187.09 |
| 2009/0085379 A1* | 4/2009 | Takahashi | B62D 25/04 296/193.06 |
| 2015/0151796 A1* | 6/2015 | Berger | B29C 70/68 296/193.06 |
| 2016/0229457 A1* | 8/2016 | Boettcher | B62D 25/04 |
| 2017/0183039 A1* | 6/2017 | Toyota | B62D 21/152 |
| 2017/0239883 A1* | 8/2017 | Terada | B33Y 10/00 |
| 2017/0240210 A1* | 8/2017 | Terada | B62D 21/152 |
| 2017/0240211 A1* | 8/2017 | Terada | B60J 1/006 |
| 2017/0253275 A1* | 9/2017 | Terada | B62D 29/04 |
| 2018/0009483 A1* | 1/2018 | Boettcher | B62D 25/04 |

FOREIGN PATENT DOCUMENTS

| | | |
|---|---|---|
| JP | 2006-273057 | 10/2006 |
| JP | 2009-255402 A | 11/2009 |
| JP | 2013-156468 A | 8/2013 |
| WO | WO 2006/046034 A1 | 5/2006 |

* cited by examiner

VEHICLE PILLAR STRUCTURE

CROSS-REFERENCE TO RELATED APPLICATION

This application is based on and claims priority under 35 USC 119 from Japanese Patent Application No. 2016-030974 filed on Feb. 22, 2016, the disclosure of which is incorporated by reference herein.

BACKGROUND

Technical Field

The present invention relates to a vehicle pillar structure.

Related Art

Japanese Patent Application Laid-open (JP-A) No. 2006-273057 discloses a pillar structure where a front pillar is configured to include a transparent pillar member and a front pillar frame that holds the pillar member. Furthermore, the front pillar frame is configured to include a front pillar inner panel and a front pillar outer panel that are each substantially frame-shaped.

Moreover, the front pillar inner panel has reinforcement walls (reinforcement members) that bridge a pair of vertical walls of the front pillar inner panel, and the reinforcement walls are placed near the surface of the pillar member on the cabin side. Because of this, the front pillar inner panel can be reinforced and the pillar member can be reinforced.

However, in this pillar structure, the following is of concern. That is, when sunlight strikes the pillar member, the reinforcement walls heat up because of the infrared radiation in the sunlight, and the heat generated in the reinforcement walls is transmitted to the pillar member. For this reason, there is the potential for degradation and warping caused by the heat to occur in the pillar member.

SUMMARY

In consideration of the circumstances described above, it is an object of the present invention to provide a vehicle pillar structure that can, even in a case where a reinforcement member is disposed in a pillar member, inhibit the generation of heat in the reinforcement member.

In a vehicle pillar structure pertaining to a first aspect of the invention, the vehicle pillar structure comprising: a pillar member configuring a skeleton of a vehicle; a reinforcement member disposed inside the pillar member, bridging a pair of side portions of the pillar member, and reinforcing the pillar member; and an infrared transmission inhibition member, the infrared transmission inhibition member covering the reinforcement member at least from a design surface side of the pillar member and inhibiting transmission of infrared radiation.

In the vehicle pillar structure pertaining to the first aspect of the invention, the reinforcement member is disposed inside the pillar member configuring the skeleton of the vehicle, and the reinforcement member bridges the pair of side portions of the pillar member. Because of this, the pillar member is reinforced by the reinforcement member.

Here, the infrared transmission inhibition member that inhibits the transmission of infrared radiation covers the reinforcement member at least from the design surface side of the pillar member. For this reason, regarding sunlight striking the pillar member from the design surface side of the pillar member, transmission of the infrared radiation in the sunlight through the infrared transmission inhibition member can be inhibited. Because of this, the infrared radiation in the sunlight can be kept from being directly applied to the reinforcement member. Consequently, the generation of heat in the reinforcement member can be controlled.

In the vehicle pillar structure pertaining to a second aspect of the invention, wherein the infrared transmission inhibition member covers the reinforcement member from a vehicle upper side in addition to the design surface side of the pillar member.

In the vehicle pillar structure pertaining to the second aspect of the invention, the infrared transmission inhibition member covers the reinforcement member from the vehicle upper side in addition to the design surface side of the pillar member. For this reason, also regarding sunlight striking the pillar member from the vehicle upper side, transmission of the infrared radiation in the sunlight through the infrared transmission inhibition member can be inhibited. Because of this, the infrared radiation in the sunlight can be kept from being directly applied to the reinforcement member.

In the vehicle pillar structure pertaining to a third aspect of the invention, wherein: the pillar member has an ultraviolet transmission inhibition member that inhibits transmission of ultraviolet radiation, and the ultraviolet transmission inhibition member configures the design surface of the pillar member.

In the vehicle pillar structure pertaining to the third aspect of the invention, the section of the pillar member configuring the design surface is configured by the ultraviolet transmission inhibition member that inhibits the transmission of ultraviolet radiation. For this reason, regarding sunlight striking the pillar member from outside the vehicle, transmission of the ultraviolet radiation in the sunlight through the ultraviolet transmission inhibition member can be inhibited. Because of this, the ultraviolet radiation in the sunlight can be kept from being directly applied to the section configuring the pillar member placed on the cabin side of the design surface. Consequently, ultraviolet radiation-induced degradation of the section configuring the pillar member placed on the cabin side of the design surface can be reduced.

In the vehicle pillar structure pertaining to a fourth aspect of the invention, wherein the infrared transmission inhibition member is also disposed between the pair of side portions and the ultraviolet transmission inhibition member.

In the vehicle pillar structure pertaining to the fourth aspect of the invention, the infrared transmission inhibition member is also disposed between the pair of side portions of the pillar member and the ultraviolet transmission inhibition member, so ultraviolet radiation in sunlight can be kept from being directly applied to the pair of side portions. Because of this, the generation of heat in the pair of side portions of the pillar member can be controlled.

In the vehicle pillar structure pertaining to a fifth aspect of the invention, wherein the infrared transmission inhibition member interconnects the pair of side portions, and the reinforcement member is embedded in the infrared transmission inhibition member.

In the vehicle pillar structure pertaining to the fifth aspect of the invention, the entire reinforcement member can be covered by the infrared transmission inhibition member while the pair of side portions are interconnected by the infrared transmission inhibition member. For this reason, infrared radiation in sunlight can be kept from being directly applied to the section configuring the pillar member placed on the cabin side of the design surface and the entire reinforcement member. Consequently, the generation of heat in the pillar member can be effectively controlled.

In the vehicle pillar structure pertaining to a sixth aspect of the invention, wherein: the ultraviolet transmission inhibition member interconnects the pair of side portions, and the reinforcement member covered by the infrared transmission inhibition member is embedded in the ultraviolet transmission inhibition member.

In the vehicle pillar structure pertaining to the sixth aspect of the invention, the entire reinforcement member covered by the infrared transmission inhibition member can be covered by the ultraviolet transmission inhibition member while the pair of side portions are interconnected by the ultraviolet transmission inhibition member. For this reason, compared to a case where the pair of side portions are interconnected by the infrared transmission inhibition member, the cost of the pillar member can be kept down. That is, usually the ultraviolet transmission inhibition member having the function of reducing the transmission of ultraviolet radiation can be made more cheaply than the infrared transmission inhibition member having the function of reducing the transmission of infrared radiation. Additionally, in the invention pertaining to the sixth aspect, the pair of side portions are interconnected by the ultraviolet transmission inhibition member, so it becomes unnecessary to place the infrared transmission inhibition member completely between the pair of side portions. Because of this, compared to a case where the pair of side portions are interconnected by the infrared transmission inhibition member, the cost of the pillar member can be kept down.

In the vehicle pillar structure pertaining to a seventh aspect of the invention, wherein the infrared transmission inhibition member is placed adjacent to the design surface side of the pillar member.

In the vehicle pillar structure pertaining to the seventh aspect of the invention, the infrared transmission inhibition member is placed adjacent to the design surface side of the pillar member, so the pillar member can be covered from the design surface side by the infrared transmission inhibition member. For this reason, compared to a case where another member is interposed between the infrared transmission inhibition member and the reinforcement member, infrared radiation in sunlight can be kept, by a simple configuration, from being directly applied to the reinforcement member.

According to the vehicle pillar structure pertaining to the first aspect and the second aspect of the invention, the generation of heat in the reinforcement member can be controlled.

According to the vehicle pillar structure pertaining to the third aspect of the invention, ultraviolet radiation-induced degradation of the section configuring the pillar member placed on the cabin side of the design surface can be reduced.

According to the vehicle pillar structure pertaining to the fourth aspect of the invention, the generation of heat in the pair of side portions of the pillar member can be controlled.

According to the vehicle pillar structure pertaining to the fifth aspect of the invention, the generation of heat in the pillar member can be effectively controlled.

According to the vehicle pillar structure pertaining to the sixth aspect of the invention, compared to a case where the pair of side portions are interconnected by the infrared transmission inhibition member, the cost of the pillar member can be kept down.

According to the vehicle pillar structure pertaining to the seventh aspect of the invention, compared to a case where another member is interposed between the infrared transmission inhibition member and the reinforcement member, infrared radiation in sunlight can be kept, by a simple configuration, from being directly applied to the reinforcement member.

BRIEF DESCRIPTION OF THE DRAWINGS

An exemplary embodiment of the present invention will be described in detail based on the following figures, wherein.

DETAILED DESCRIPTION

Figure 1:
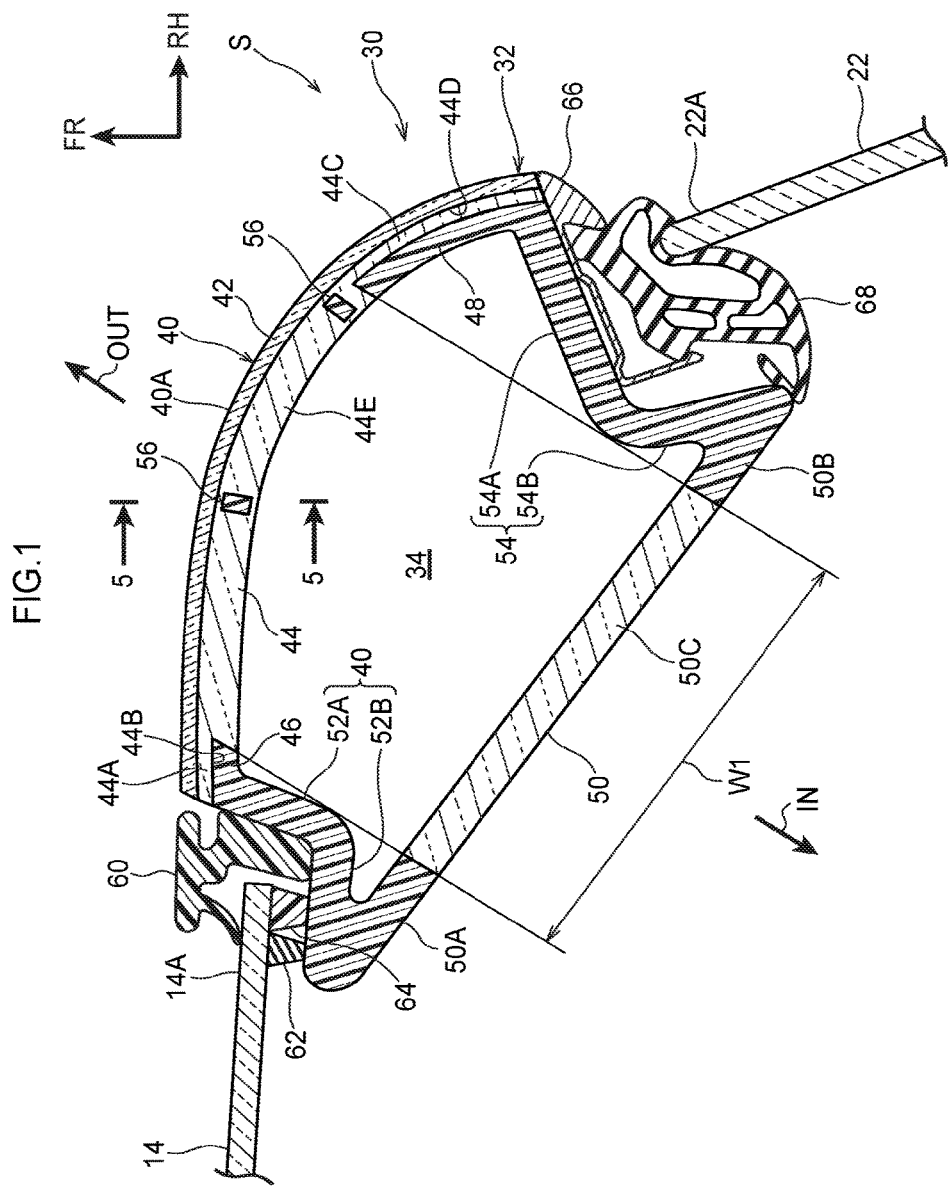
FIG. 1 is a plan sectional view (a sectional view along line 1-1 of FIG. 3), seen from a vehicle upper side, showing a pillar member of a front pillar to which a vehicle pillar structure pertaining to the embodiment has been applied.

A vehicle pillar structure S pertaining to an embodiment will be described below using the drawings. It should be noted that arrow FR appropriately shown in the drawings indicates a vehicle forward direction of a vehicle (automobile) V equipped with a front pillar 30 to which the vehicle pillar structure S has been applied, arrow UP indicates a vehicle upward direction, and arrow RH indicates a vehicle rightward direction. Hereinafter, when description is given simply using the directions of front/rear, upper/lower, and right/left, unless otherwise specified these will be understood to mean front/rear in the vehicle forward and rearward direction, upper/lower in the vehicle upper and lower direction, and right/left in the vehicle rightward and leftward direction (the vehicle width direction).

Figure 2:
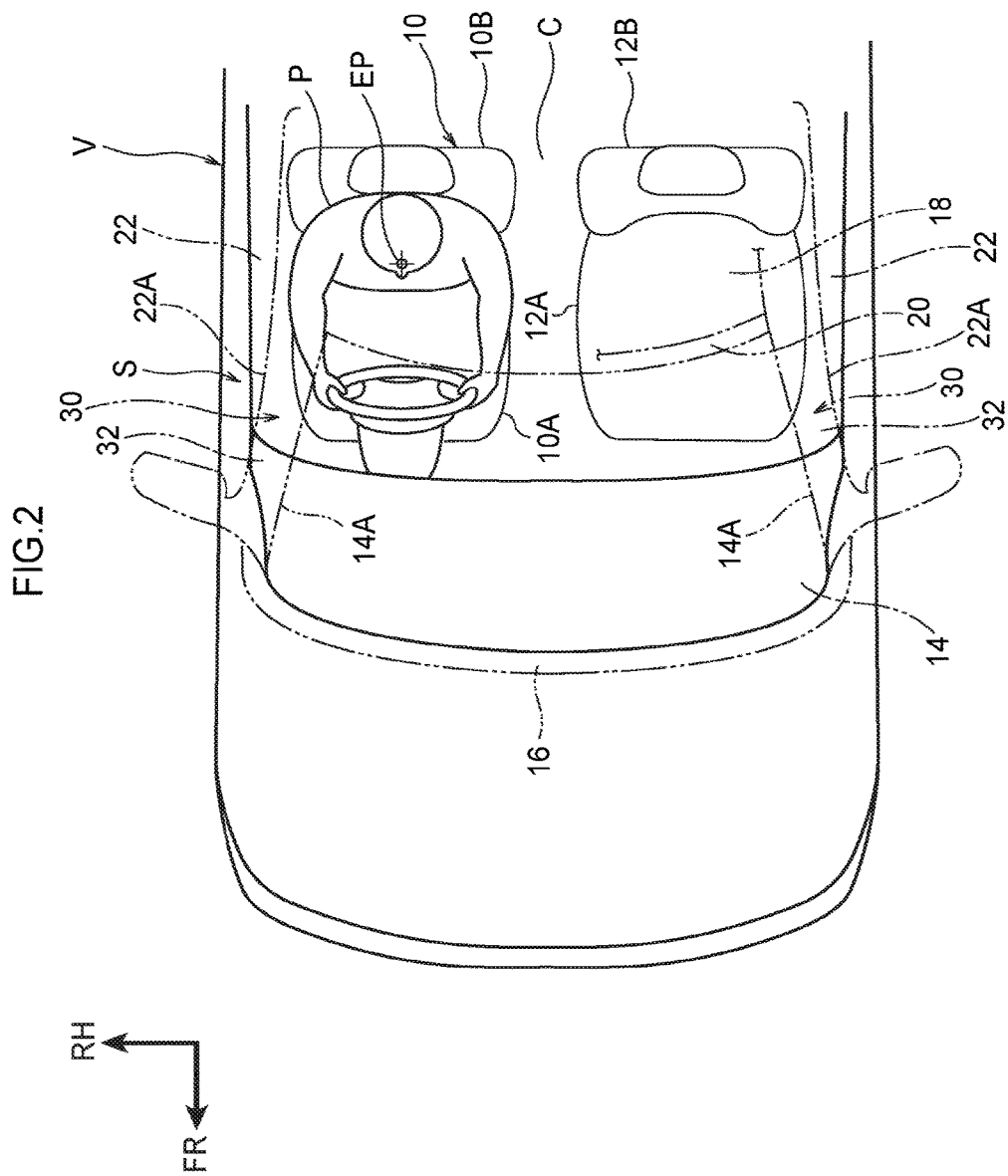
FIG. 2 is a schematic plan view showing the front portion of a cabin interior of an automobile equipped with the front pillar shown in FIG. 1.

First, the general configuration of the automobile V will be described below. In FIG. 2 the front portion of a cabin C interior in the automobile V is shown by way of a schematic plan view. As shown in this drawing, a vehicle seat 10 for a driver's seat is disposed in the right side portion of the front portion of the cabin C. The vehicle seat 10 is configured to include a seat cushion 10A, on which an occupant P (hereinafter called "the driver P") sits, and a seat back 10B, which supports the back of the driver P. The lower end portion of the seat back 10B is connected to the rear end portion of the seat cushion 10A.

Furthermore, a vehicle seat 12 for a front passenger seat is disposed in the left side portion of the front portion of the cabin C. The vehicle seat 12 is, like the vehicle seat 10, configured to include a seat cushion 12A and a seat back 12B. Thus, the automobile V is a vehicle with right-side steering wheel.

A windshield glass 14 is disposed in the front end portion of the cabin C of the automobile V. The windshield glass 14 is formed as a transparent plate and is placed sloping rearward when heading upward as seen in a side view (see FIG. 3). Furthermore, the windshield glass 14 is formed in a curved shape whose vehicle width direction center portion swells a little convexly forward. Additionally, vehicle width direction outer end portions 14A of the windshield glass 14 are held in pillar members 32 of front pillars 30 described later. Furthermore, the lower end portion of the windshield glass 14 is secured by an adhesive (not shown in the drawings) to a cowl 16 that extends along the vehicle width direction. It should be noted that the cowl 16 is disposed along the upper end portion of a dash panel (not shown in the drawings) configuring the front portion of the cabin C. Furthermore, the upper end portion of the windshield glass 14 is secured by an adhesive (not shown in the drawings) to a front header 20 disposed along the vehicle width direction on the front end portion of a roof 18 configuring the upper portion of the cabin C.

Figure 3:
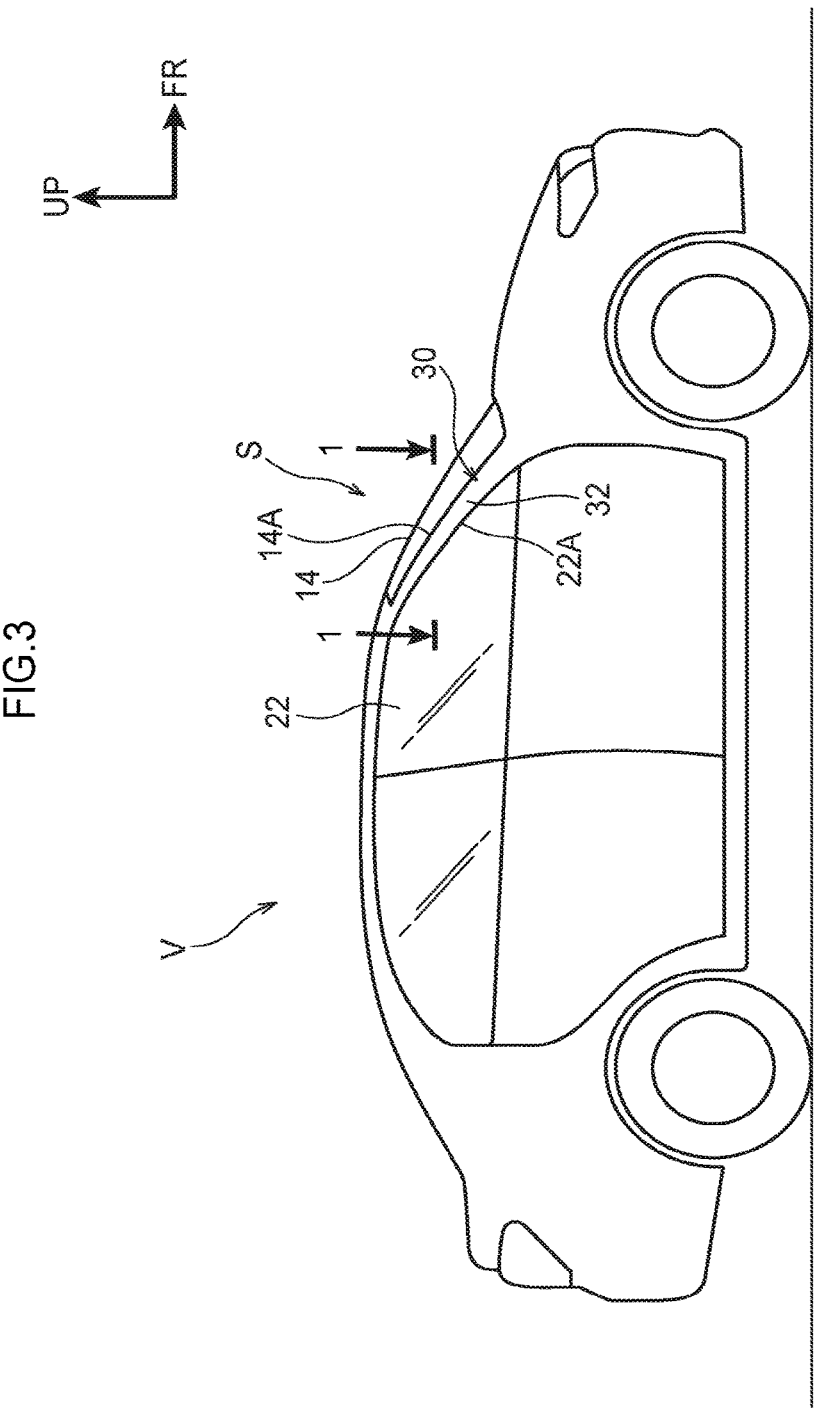
FIG. 3 is a side view, seen from the right side, showing the entire automobile shown in FIG. 2.

Furthermore, as shown in FIG. 3, transparent plate-like side door glasses 22 are disposed on the side portions of the cabin C. Additionally, front pillars 30 are disposed between front end portions 22A of the side door glasses 22 and the vehicle width direction outer end portions 14A of the windshield glass 14.

Next, the front pillars 30, which are the relevant portion of the present invention, will be described. As shown in FIG. 2, the front pillars 30 are disposed on both vehicle width direction sides of the windshield glass 14 placed in the front portion of the cabin C. Additionally, the vehicle pillar structure S of the present embodiment is applied to the front pillar 30 on the driver's seat side (the right side). For this reason, in the following description, mainly the front pillar 30 on the right side will be described.

The front pillars 30 are made of resin. Furthermore, each front pillar 30 has a hollow pillar-like pillar member 32 configuring a skeleton of the automobile V. The pillar members 32 are placed on the vehicle width direction outer sides of the windshield glass 14 and extend along the vehicle width direction outer end portions 14A of the windshield glass 14. Additionally, the upper end portions of the pillar members 32 are secured via brackets or the like to the front header 20. Furthermore, the lower end portions of the pillar members 32 are secured to the upper end portions of front pillar lower members (not shown in the drawings) that are made of metal and extend in the substantially upper and lower direction.

As shown in FIG. 1, the pillar member 32 is configured as a hollow structure having a substantially elliptical closed cross section 34 whose longitudinal direction coincides with the substantially vehicle width direction as seen in a plan sectional view. Specifically, the pillar member 32 is configured to include an outer wall 40, which configures the wall portion of the pillar member 32 on the vehicle outer side, and an inner wall 50, which configures the wall portion of the pillar member 32 on the cabin C side. Furthermore, the pillar member 32 has a first side wall 52, which interconnects the vehicle width direction inner end portion (in other words, the end portion on the windshield glass 14 side) of the outer wall 40 and the vehicle width direction inner end portion of the inner wall 50, and a second side wall 54, which interconnects the vehicle width direction outer end portion (in other words, the end portion on the side door glass 22 side) of the outer wall 40 and the vehicle width direction outer end portion of the inner wall 50.

The outer wall 40 is formed in a curved shape that swells a little convexly toward the vehicle outer side (specifically, obliquely forward and rightward). A surface 40A on the vehicle outer side of the outer wall 40 (the surface on the opposite side of the closed cross section 34 side) configures a design surface of the pillar member 32, and the section of the outer wall 40 configuring the surface 40A (in other words, the section of the outer wall 40 on the outer peripheral side) is an ultraviolet transmission inhibition layer 42 serving as an "ultraviolet transmission inhibition member." The ultraviolet transmission inhibition layer 42 is configured by a transparent resin material containing a material that absorbs ultraviolet radiation (e.g., a transparent resin material whose ultraviolet transmittance is equal to or less than 20%). Because of this, when sunlight strikes the pillar member 32 from outside the vehicle, transmission of the ultraviolet radiation in the sunlight through the ultraviolet transmission inhibition layer 42 is inhibited. That is, the "ultraviolet transmission inhibition layer (ultraviolet transmission inhibition member) that inhibits the transmission of ultraviolet radiation" in the present invention also includes an ultraviolet transmission inhibition layer (ultraviolet transmission inhibition member) whose ultraviolet transmittance is outside 0%. Additionally, the plate thickness (layer thickness) of the ultraviolet transmission inhibition layer 42 is set constant (e.g., set to 2 to 3 mm).

Furthermore, the section on the inner peripheral side of the outer wall 40 (in other words, the section on the closed cross section 34 side) is an infrared transmission inhibition layer 44 serving as an "infrared transmission inhibition member." The infrared transmission inhibition layer 44 is configured by a transparent resin material containing a material that absorbs infrared radiation (e.g., a transparent resin material whose infrared transmittance is equal to or less than 20%). Because of this, when sunlight strikes the pillar member 32 from outside the vehicle, transmission of the infrared radiation in the sunlight through the infrared transmission inhibition layer 44 is inhibited. That is, the "infrared transmission inhibition layer (infrared transmission inhibition member) that inhibits the transmission of infrared radiation" in the present invention also includes an infrared transmission inhibition layer (infrared transmission inhibition member) whose infrared transmittance is outside 0%.

Furthermore, the infrared transmission inhibition layer 44 is formed in a substantially T shape as seen in a plan sectional view. Specifically, a first cutout portion 44B that opens to the closed cross section 34 side is formed in a vehicle width direction inner end portion 44A (the end portion on the windshield glass 14 side) of the infrared transmission inhibition layer 44, and a second cutout portion 44D that opens to the closed cross section 34 side is formed in a vehicle width direction outer end portion 44C (the end portion on the side door glass 22 side) of the infrared transmission inhibition layer 44. Additionally, the width direction middle portion (the section between the vehicle width direction inner end portion 44A and the vehicle width direction outer end portion 44C) of the infrared transmission inhibition layer 44 is a main body portion 44E. Furthermore, the plate thickness (layer thickness) of the infrared transmission inhibition layer 44 at the vehicle width direction inner end portion 44A and at the vehicle width direction outer end portion 44C is set equal to or less than 5 mm, for example.

Moreover, the section on the inner peripheral side (the closed cross section 34 side) of the vehicle width direction inner end portion of the outer wall 40 is a first inner layer 46 serving as a "side portion." The first inner layer 46 configures part of the vehicle width direction inner side portion of the pillar member 32. Furthermore, the section on the inner peripheral side (the closed cross section 34 side) of the vehicle width direction outer end portion of the outer wall 40 is a second inner layer 48 serving as a "side portion." The second inner layer 48 configures part of the vehicle width direction outer side portion of the pillar member 32. Furthermore, the first inner layer 46 and the second inner layer 48 are configured by an opaque resin material (in the present embodiment, black-colored carbon fiber-reinforced resin, for example). Additionally, the first inner layer 46 is placed inside the first cutout portion 44B, the second inner layer 48 is placed inside the second cutout portion 44D, and the first inner layer 46 and the second inner layer 48 are formed integrally with the infrared transmission inhibition layer 44. Because of this, the first inner layer 46 and the second inner layer 48 are interconnected by the infrared transmission inhibition layer 44 (the main body portion 44E). Moreover, when sunlight strikes the pillar member 32 from outside the vehicle, the infrared radiation in the sunlight is kept, by the infrared transmission inhibition layer 44, from being directly applied to the first inner layer 46 and the second inner layer 48.

Furthermore, the surfaces on the inner peripheral side (the closed cross section 34 side) of the first inner layer 46 and the second inner layer 48 are even with the surface on the inner peripheral side (the closed cross section 34 side) of the main body portion 44E of the infrared transmission inhibition layer 44, and the plate thicknesses (layer thicknesses) of the first inner layer 46 and the second inner layer 48 are set equal to or less than 5 mm, for example. Because of this, the vehicle width direction inner end portion and the vehicle width direction outer end portion of the outer wall 40 have a three-layer structure with the ultraviolet transmission inhibition layer 42, the infrared transmission inhibition layer 44, and the first inner layer 46 (the second inner layer 48). Furthermore, the width direction middle portion of the outer wall 40 has, in its section excluding reinforcement beams 56 described later, a two-layer structure with the ultraviolet transmission inhibition layer 42 and the infrared transmission inhibition layer 44.

The inner wall 50 of the pillar member 32 is placed sloping substantially straightly rearward when heading outward in the vehicle width direction as seen in a plan sectional view. A vehicle width direction inner end 50A and a vehicle width direction outer end 50B of the inner wall 50 are configured by the same opaque resin material (i.e., carbon fiber-reinforced resin) as that of the first inner layer 46 and the second inner layer 48 of the outer wall 40. Furthermore, the width direction middle portion of the inner wall 50 (the section between the vehicle width direction inner end portion 50A and the vehicle width direction outer end portion 50B) is an inner transparent portion 50C configured by a transparent resin material. The inner transparent portion 50C is formed integrally with the vehicle width direction inner end portion 50A and the vehicle width direction outer end portion 50B.

Additionally, the inner transparent portion SOC and the main body portion 44E of the infrared transmission inhibition layer 44 are placed in such a way as to coincide with each other as seen from the position of the driver P. That is, as seen in a plan sectional view at the position of an eye point EP of the driver P (which, as shown in FIG. 2, is the midpoint between both eyes of the driver P and the center point of a line joining both eyes of the driver P), the inner transparent portion 50C and the main body portion 44E of the infrared transmission inhibition layer 44 are placed opposing each other in the direction in which the eye point EP and the pillar member 32 oppose each other (see the direction of arrow OUT and the direction of arrow IN shown in FIG. 1). Because of this, the driver P can see outside the vehicle through the inner transparent portion 50C, the main body portion 44E of the infrared transmission inhibition layer 44, and the ultraviolet transmission inhibition layer 42.

It should be noted that the position of the eye point EP of the driver P is, for example, set using a dummy (e.g., an AM50 dummy covering from smaller builds up to 50% of Europeans and Americans males) on the basis of the position of the eye point EP of the dummy, in a driving posture, sitting in the vehicle seat 10. Additionally, FIG. 1 is depicted as a plan sectional view at the position of the eye point EP of the driver P. Moreover, the transmittance of the ultraviolet transmission inhibition layer 42, the infrared transmission inhibition layer 44, and the inner transparent portion 50C is set equal to or greater than 50%, for example, so that the driver P can see outside the vehicle through the pillar 32. Furthermore, as seen in a plan sectional view at the position of the eye point EP of the driver P, a width dimension W1 (a dimension along a direction orthogonal to the direction in which the eye point EP of the driver P and the inner transparent portion 50C oppose each other) of the main body portion 44E of the infrared transmission inhibition layer 44 and the inner transparent portion 50 is set to 65 mm, for example.

The first side wall 52 of the pillar member 32 is configured by the same opaque resin material (i.e., carbon fiber-reinforced resin) as that of the first inner layer 46 of the outer wall 40 and the vehicle width direction inner end portion 50A of the inner wall 50 and is formed integrally with the first inner layer 46 and the vehicle width direction inner end portion 50A of the inner wall 50. The first side wall 52 is formed in a substantially inverted L shape that opens forward and inward in the vehicle width direction as seen in a plan sectional view. Additionally, the wall portion of the first side wall 52 connected to the outer wall 40 (the first inner layer 46) is a first outer side wall 52A, and the wall portion of the first side wall 52 connected to the inner wall 50 (the vehicle width direction inner end portion 50A) is a first inner side wall 52B. The first outer side wall 52A is placed with its plate thickness direction coinciding with a direction substantially orthogonal to the plate thickness direction of the windshield glass 14 as seen in a plan sectional view in the vehicle width direction outer side. In other words, the first outer side wall 52A is placed substantially parallel to the end surface of the vehicle width direction outer end portion 14A of the windshield glass 14. Furthermore, a rain gutter 60 is disposed between the vehicle width direction outer end portion 14A of the windshield glass 14 and the first outer side wall 52A. The rain gutter 60 is configured in such a way that drops of water and the like on the windshield glass 14 do not get into the space between the vehicle width direction outer end portion 14A and the first outer side wall 52A.

The first inner side wall 52B is placed on the cabin C side (the rear side) of the vehicle width direction outer end portion 14A of the windshield glass 14 and is placed opposing the windshield glass 14 in the plate thickness direction of the windshield glass 14. An adhesive 62 such as a urethane sealant, for example, is directly applied to the surface of the first inner side wall 52B opposing the windshield glass 14, and the vehicle width direction outer end portion 14A of the windshield glass 14 is held on the first inner side wall 52B via the adhesive 62. The adhesive 62 has elasticity, seals the space between the windshield glass 14 and the front pillar 30, and utilizes its elasticity to absorb differences in extension and contraction between the windshield glass 14 and the front pillar 30 caused by changes in temperature. Moreover, a molding 64 is disposed between the vehicle width direction outer end portion 14A of the windshield glass 14 and the first inner side wall 52B in a position on the vehicle width direction outer side of the adhesive 62. Additionally, the space between the windshield glass 14 and the first inner side wall 52B is filled in by the molding 64.

The second side wall 54 of the pillar member 32 is configured by the same opaque resin material (i.e., carbon fiber-reinforced resin) as that of the second inner layer 48 of the outer wall 40 and the vehicle width direction outer end portion 50B of the inner wall 50 and is formed integrally with the second inner layer 48 and the vehicle width direction outer end portion 50B of the inner wall 50. Furthermore, the second side wall 54 is formed in a substantially L shape that opens rearward and outward in the vehicle width direction as seen in a plan sectional view. In other words, the second side wall 54 extends inside the closed cross section 34 of the pillar member 32 in relation to the vehicle width direction outer ends of the outer wall 40 and the inner wall 50. Additionally, the wall portion of the second side wall 54 connected to the outer wall 40 (the second inner layer 48) is a second outer side wall 54A, and the wall portion of the second side wall 54 connected to the inner wall 50 (the vehicle width direction outer end portion 50B) is a second inner side wall 54B.

Furthermore, a retainer 66 formed by bending a strip of stainless steel, for example, is disposed on the second side wall 54. The retainer 66 is formed in a substantially U shape that opens outward in the vehicle width direction and rearward as seen in a plan sectional view. Additionally, the bottom wall of the retainer 66 is secured to the second outer side wall 54A by fastening members such as screws (not shown in the drawings). Furthermore, a door seal 68 is attached to the retainer 66. The door seal 68 is made of an elastic member such as ethylene propylene diene monomer (EPDM). Because of this, the door seal 68 is held on the second side wall 54 via the retainer 66, and the front end portion 22A of the side door glass 22 is held on the second side wall 54 via the door seal 68.

Figure 4:
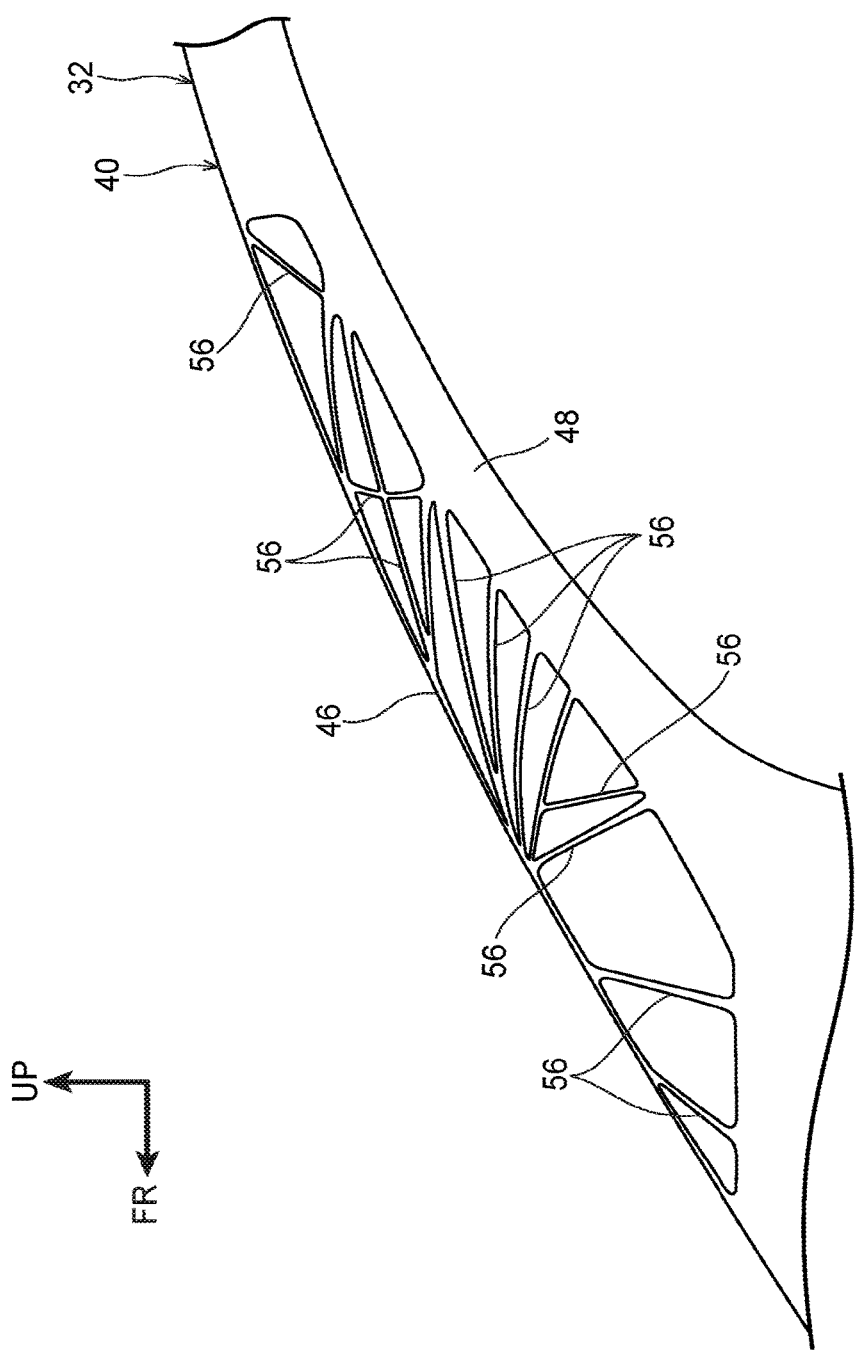
FIG. 4 is a side view, seen from inside in the vehicle width direction, schematically showing reinforcement beams formed inside an infrared transmission inhibition layer of an outer wall shown in FIG. 1.

Furthermore, reinforcement beams 56 serving as "reinforcement members" are integrally formed in the outer wall 40 of the pillar member 32. The reinforcement beams 56 are embedded inside the infrared transmission inhibition layer 44 of the outer wall 40. The reinforcement beams 56 bridge the first inner layer 46 and the second inner layer 48 of the outer wall 40 and extend substantially straightly along the surface 40A of the outer wall 40 (see FIG. 4). Additionally, the reinforcement beams 56 are configured by the same resin material (i.e., carbon fiber-reinforced resin) as that of the first inner layer 46 and the second inner layer 48 of the outer wall 40. Furthermore, the shape (the extension direction, a width dimension W2 (see FIG. 5), a thickness dimension T (see FIG. 5), etc.) of the reinforcement beams 56 is set using a technique such as topological data analysis, and the thickness dimension T of the reinforcement beams 56 is set to 4 mm, for example.

Figure 5:
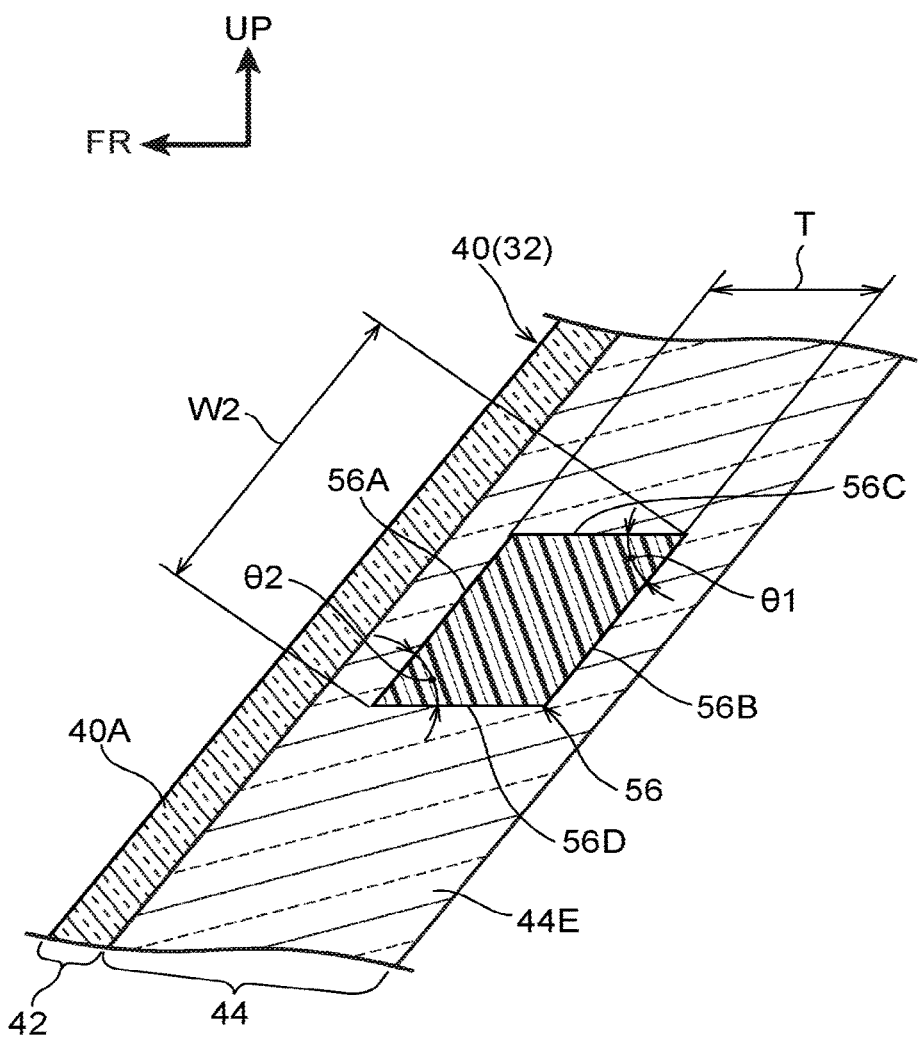
FIG. 5 is an enlarged sectional view (a sectional view along line 5-5 of FIG. 1), seen from inside in the vehicle width direction, showing a reinforcement beam shown in FIG. 1.

Moreover, as shown in FIG. 5, the cross section of each reinforcement beam 56 as seen from inside in the vehicle width direction is formed in a quadrilateral shape (more specifically, a rhombus shape). Specifically, each reinforcement beam 56 has a front face (a vehicle forward and rearward direction outer face) 56A placed parallel to the surface 40A of the outer wall 40 and a rear face (a vehicle forward and rearward direction inner face) 56B placed parallel to the front face 56A. The front face 56A and the rear face 56B are placed sloping rearward when heading upward. Furthermore, each reinforcement beam 56 has an upper face 56C, extending from the upper end of the rear face 56B forward along the vehicle forward and rearward direction, and a lower face 56D, extending from the lower end of the front face 56A rearward along the vehicle forward and rearward direction. That is, as seen in a sectional view seen from inside in the vehicle width direction, the upper face 56C and the lower face 56D are placed parallel to each other, and an angle θ1 formed by the upper face 56C and the rear face 56B and an angle θ2 formed by the lower face 56D and the front face 56A are set to acute angles.

Moreover, as mentioned above, the reinforcement beams 56 are embedded inside the infrared transmission inhibition layer 44 of the outer wall 40. For this reason, the front face 56A, the upper face 56C, the rear face 56B, and the lower face 56D of each reinforcement beam 56 are covered by the infrared transmission inhibition layer 44. Because of this, infrared radiation in sunlight is kept from being directly applied to the front face 56A, the upper face 56C, the rear face 56B, and the lower face 56D of each reinforcement beam 56.

Next, the action and effects of the vehicle pillar structure S pertaining to the present embodiment will be described.

In the vehicle pillar structure S configured as described above, the front pillar 30 has the pillar member 32, and the pillar member 32 extends along the vehicle width direction outer end portion 14A of the windshield glass 14. Because of this, the pillar member 32 is placed on the front side and the vehicle width direction outer side of the driver P, so the field of vision of the driver P on the front side and the vehicle width direction outer side of the pillar member 32 is obstructed.

To address this, the ultraviolet transmission inhibition layer 42 and the infrared transmission inhibition layer 44 that are configured by a transparent resin material are formed in the outer wall 40 of the pillar member 32, and the inner transparent portion 50C that is configured by a transparent resin material is formed in the inner wall 50 of the pillar member 32. Additionally, the ultraviolet transmission inhibition layer 42 and the infrared transmission inhibition layer 44 and the inner transparent portion 50C are placed in such a way as to coincide with each other as seen from the position of the driver P. For this reason, the driver P can see outside the vehicle through the inner transparent portion 50C, the infrared transmission inhibition layer 44, and the ultraviolet transmission inhibition layer 42.

Furthermore, the reinforcement beams 56 configured by carbon fiber-reinforced resin bridge the first inner layer 46 and the second inner layer 48 of the outer wall 40. Because of this, the pillar member 32 is reinforced by the reinforcement beams 56.

Here, the reinforcement beams 56 are embedded inside the infrared transmission inhibition layer 44 of the outer wall 40. For this reason, the front face 56A, the upper face 56C, the rear face 56B, and the lower face 56D of each reinforcement beam 56 are covered by the infrared transmission inhibition layer 44. Because of this, regarding sunlight striking the pillar member 32 from outside the vehicle, transmission of the infrared radiation in the sunlight through the infrared transmission inhibition layer 44 is inhibited, so the infrared radiation in the sunlight can be kept from being directly applied to the reinforcement beams 56. In other words, the amount of infrared radiation applied to the reinforcement beams 56 can be reduced. Consequently, the generation of heat in the reinforcement beams 56 can be controlled. As a result, the weatherability of the pillar member 32 can be improved. More specifically, thermal degradation of the pillar member 32 or warping of the pillar member 32 caused by the reinforcement beams 56 heating up can be controlled, and thermal expansion of the pillar member 32 can be controlled.

Furthermore, in the pillar member 32, the surface 40A of the outer wall 40 configures the design surface of the pillar member 32, and the section of the outer wall 40 configuring the surface 40A is configured by the ultraviolet transmission inhibition layer 42 that inhibits the transmission of ultraviolet radiation. For this reason, regarding sunlight striking the pillar member 32 from outside the vehicle, transmission of the ultraviolet radiation in the sunlight through the ultraviolet transmission inhibition layer 42 can be inhibited. Because of this, the ultraviolet radiation in the sunlight can be kept from being directly applied to the sections (specifically, the infrared transmission inhibition layer 44 of the outer wall 40, the first inner layer 46, the second inner layer 48, the first outer side wall 52A of the first side wall 52, the second outer side wall 54A of the second side wall 54, and the inner transparent portion 50C of the inner wall 50) of the pillar member 32 placed on the cabin C side (the closed cross section 34 side) of the surface 40A of the outer wall 40. Consequently, ultraviolet radiation-induced degradation of the sections of the pillar member 32 placed on the cabin C side of the surface 40A of the outer wall 40 can be reduced. In particular, the transparency of the infrared transmission inhibition layer 44 and the inner transparent portion 50C of the inner wall 50 can be kept from being reduced because the infrared transmission inhibition layer 44 and the inner transparent portion 50C of the inner wall 50 are configured by a transparent resin material.

Furthermore, in the outer wall 40, the infrared transmission inhibition layer 44 is placed adjacent to the closed cross section 34 side of the entire ultraviolet transmission inhibition layer 42. Additionally, the vehicle width direction inner end portion 44A of the infrared transmission inhibition layer 44 is disposed between the ultraviolet transmission inhibition layer 42 and the first inner layer 46, and the vehicle width direction outer end portion 44C of the infrared transmission inhibition layer 44 is disposed between the ultraviolet transmission inhibition layer 42 and the second inner layer 48. For this reason, ultraviolet radiation in sunlight can be kept from being directly applied to the first inner layer 46 and the second inner layer 48 of the outer wall 40. Because of this, the generation of heat in the first inner layer 46 and the second inner layer 48 of the pillar member 32 can be controlled.

Furthermore, the reinforcement beams 56 are embedded inside the infrared transmission inhibition layer 44 of the outer wall 40. For this reason, the infrared transmission inhibition layer 44 is adjacent to the front face 56A, the upper face 56C, the rear face 56B, and the lower face 56D of each reinforcement beam 56. Because of this, the front face 56A, the upper face 56C, the rear face 56B, and the lower face 56D of each reinforcement beam 56 can be covered by the infrared transmission inhibition layer 44. Consequently, compared to a hypothetical case where the ultraviolet transmission inhibition layer 42 is interposed between the infrared transmission inhibition layer 44 and the reinforcement beams 56, infrared radiation in sunlight can be kept, by a simple configuration, from being directly applied to the reinforcement beams 56.

(Modification Example of Outer Wall 40 of Pillar Member 32)

Figure 6:
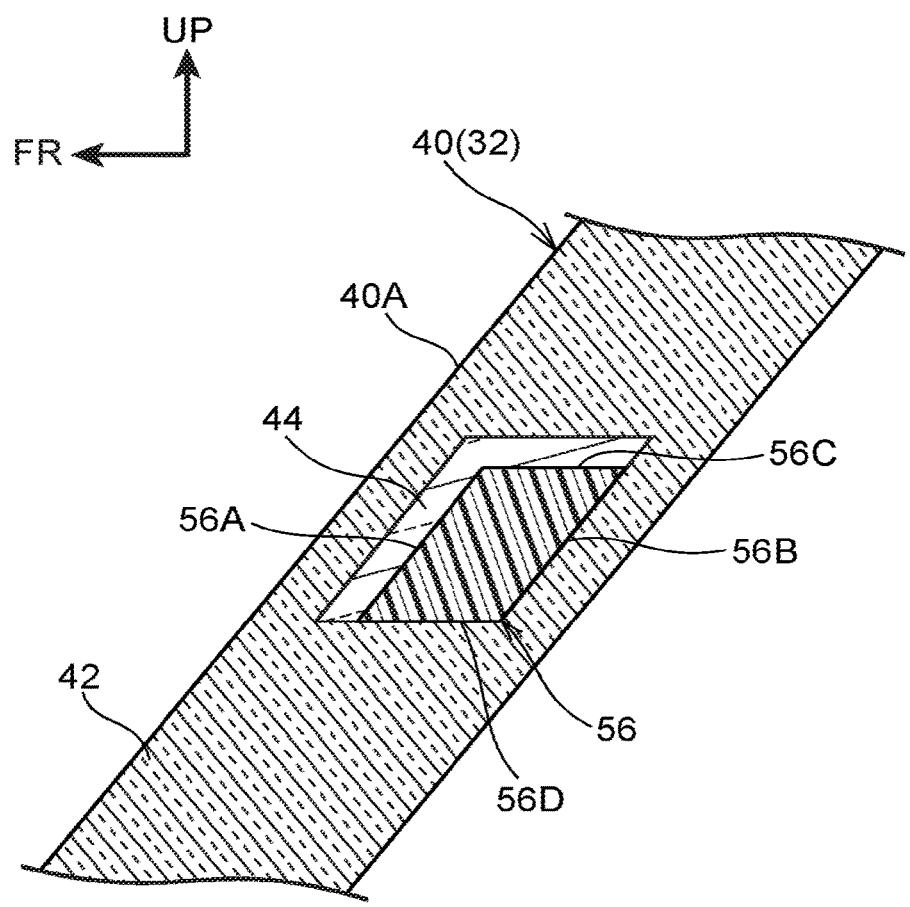
FIG. 6 is a sectional view, corresponding to FIG. 5, showing one version of a modification example of the configuration of the outer wall shown in FIG. 5.

Next, an modification example of the outer wall 40 of the pillar member 32 will be described using FIG. 6. In this modification example, the main body portion 44E of the infrared transmission inhibition layer 44 of the embodiment is omitted, and the infrared transmission inhibition layer 44 is configured to cover the front face 56A and the upper face 56C of each reinforcement beam 56. In other words, the infrared transmission inhibition layer 44 covers each reinforcement beam 56 from the surface 40A side of the outer wall 40 and the upper side. Because of this, whereas in the embodiment the infrared transmission inhibition layer 44 is continuously disposed between the first inner layer 46 and the second inner layer 48 of the outer wall 40, in this modification example the infrared transmission inhibition layer 44 is partially disposed between the first inner layer 46 and the second inner layer 48 of the outer wall 40.

Furthermore, in this modification example, the section corresponding to the main body portion 44E of the infrared transmission inhibition layer 44 of the embodiment is configured as the ultraviolet transmission inhibition layer 42, and the reinforcement beams 56 covered by the infrared transmission inhibition layer 44 are embedded inside the ultraviolet transmission inhibition layer 42. That is, although the drawings do not show this, the ultraviolet transmission inhibition layer 42 is formed in a substantially T shape as seen in a plan sectional view, interconnects the first inner layer 46 and the second inner layer 48 of the outer wall 40, and covers each entire reinforcement beam 56 covered by the infrared transmission inhibition layer 44.

Because of this, in this modification example, when sunlight strikes the pillar member 32 from the front side or the upper side, the infrared radiation in the sunlight can be kept from being directly applied to the reinforcement beams 56. That is, when sunlight strikes the pillar member 32, the sunlight strikes the pillar member 32 mainly from the front side, the upper side, and obliquely from the front side and the upper side. In contrast, in this modification example, the infrared transmission inhibition layer 44 is configured to cover each reinforcement beam 56 from the front side and the upper side. For this reason, regarding sunlight striking the pillar member 32 from the front side, the upper side, and obliquely from the front side and the upper side, transmission of the infrared radiation in the sunlight through the infrared transmission inhibition layer 44 is inhibited. Because of this, the infrared radiation in the sunlight can be kept from being directly applied to the reinforcement beams 56. Consequently, in this modification example also, the generation of heat in the reinforcement beams 56 can be controlled.

Furthermore, in this modification example, the front face 56A and the upper face 56C of each reinforcement beam 56 is covered by the infrared transmission inhibition layer 44. Moreover, the ultraviolet transmission inhibition layer 42 interconnects the first inner layer 46 and the second inner layer 48 of the outer wall 40 and covers each entire reinforcement beam 56 covered by the infrared transmission inhibition layer 44. Because of this, compared to the embodiment, the cost of the pillar member 32 can be kept down. That is, usually the ultraviolet transmission inhibition layer 42 having the function of inhibiting the transmission of ultraviolet radiation can be made more cheaply than the infrared transmission inhibition layer 44 having the function of inhibiting the transmission of infrared radiation. Additionally, in this modification example, the first inner layer 46 and the second inner layer 48 of the outer wall 40 are interconnected by the ultraviolet transmission inhibition layer 42, so it becomes unnecessary to place the infrared transmission inhibition layer 44 completely between the first inner layer 46 and the second inner layer 48. In other words, the main body portion 44E of the infrared transmission inhibition layer 44 can be omitted and the infrared transmission inhibition layer 44 can be partially disposed between the first inner layer 46 and the second inner layer 48. Consequently, compared to the embodiment, the cost of the pillar member 32 can be kept down.

Furthermore, as seen in a sectional view seen from inside in the vehicle width direction, each reinforcement beam 56 is formed in a rhombus shape and slopes rearward when heading upward. For this reason, even when sunlight strikes the reinforcement beams 56 from the upper side, the infrared radiation in the sunlight can be kept from being applied to the rear face 56B of each reinforcement beam 56. Because of this, in this modification example also, in which the infrared transmission inhibition layer 44 is configured to cover only the front face 56A and the upper face 56C of each reinforcement beam 56, the generation of heat in the reinforcement beams 56 can be effectively controlled.

It should be noted that, although in this modification example the infrared transmission inhibition layer 44 is configured to cover the front face 56A and the upper face 56C of each reinforcement beam 56, the infrared transmission inhibition layer 44 may also be configured to cover the rear face 56B or the lower face 56D of each reinforcement beam 56 in addition to the front face 56A and the upper face 56C of each reinforcement beam 56. Or, like in the embodiment, the infrared transmission inhibition layer 44 may also be configured to cover the entire periphery of each reinforcement beam 56.

Furthermore, in this modification example, the infrared transmission inhibition layer 44 is placed adjacent to the front face 56A and the upper face 56C of each reinforcement beam 56, but the ultraviolet transmission inhibition layer 42 may also be interposed between the infrared transmission inhibition layer 44 and each reinforcement beam 56.

Figure 7:
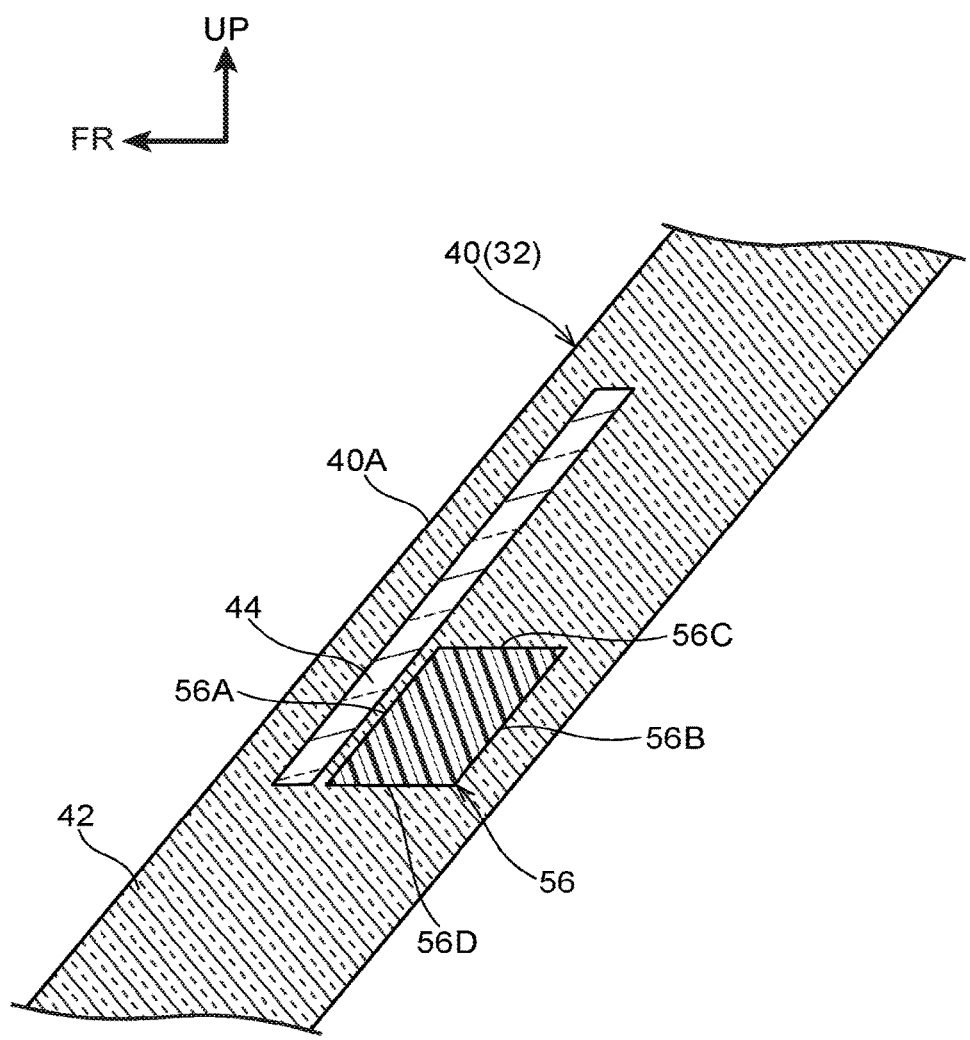
FIG. 7 is a sectional view, corresponding to FIG. 5, showing another version of the modification example of the configuration of the outer wall shown in FIG. 5.

Furthermore, in this modification example, the infrared transmission inhibition layer 44 is bent in a substantially inverted L shape as seen in a side sectional view and covers the front face 56A and the upper face 56C of each reinforcement beam 56, but the shape of the infrared transmission inhibition layer 44 is not limited to this. For example, as shown in FIG. 7, the upper end portion of the infrared transmission inhibition layer 44 that covers the front face 56A of the reinforcement beam 56 from the front side (the surface 40A side of the outer wall 40) may also be extended upward, with the extended section being placed in such a way as to coincide with the upper face 56C of the reinforcement beam 56 in the upper and lower direction. In this case also, the infrared transmission inhibition layer 44 can cover the upper face 56C of the reinforcement beam 56 from the upper side. It should be noted that FIG. 7 shows an example where the ultraviolet transmission inhibition layer 42 is interposed between the infrared transmission inhibition layer 44 and the reinforcement beam 56.

Furthermore, in the embodiment, the section of the pillar member 32 on the outer peripheral side of the outer wall 40 is configured by the ultraviolet transmission inhibition layer 42, but the ultraviolet transmission inhibition layer 42 may also be omitted from the outer wall 40.

Figure 8:
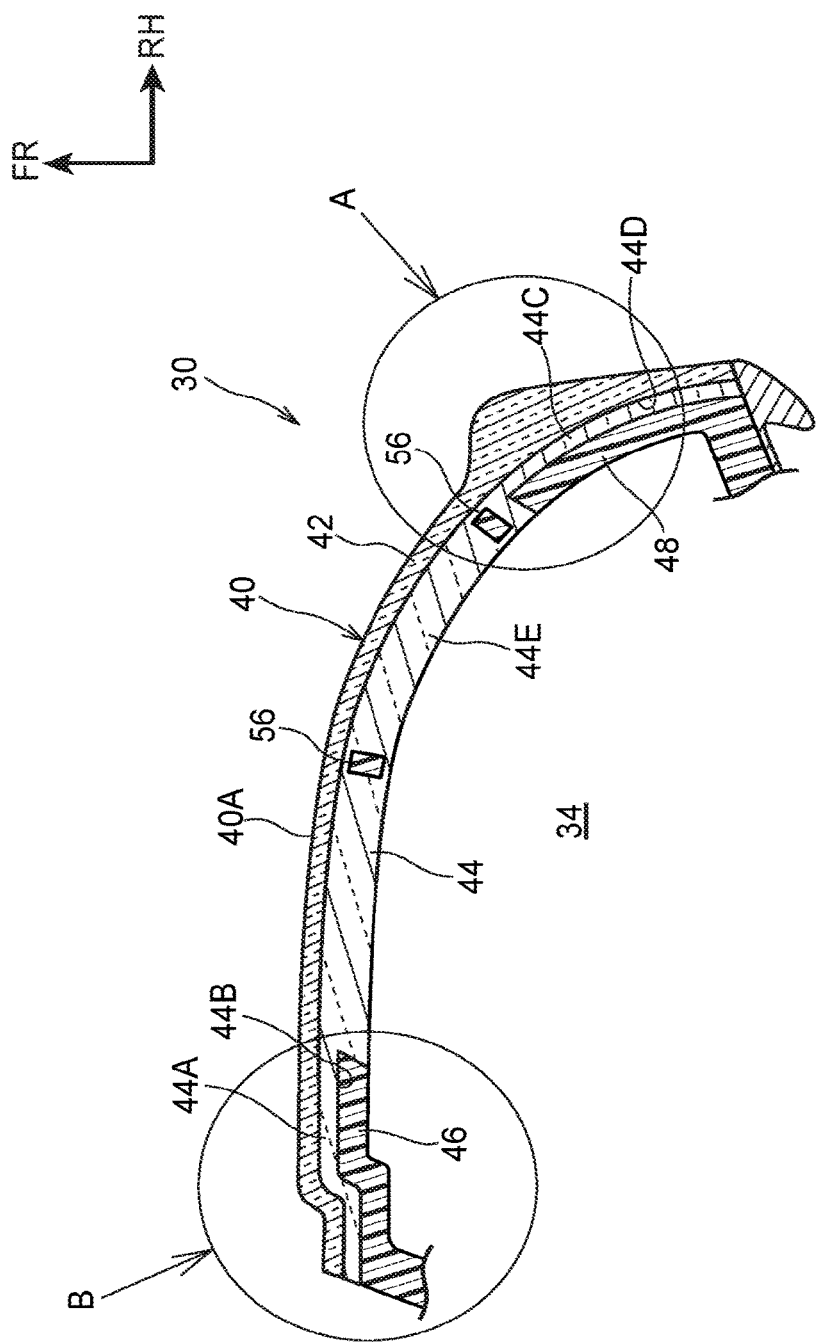
FIG. 8 is a plan sectional view, showing a modification example of the shape of the outer wall shown in FIG. 1.

Furthermore, in the embodiment, the plate thickness (layer thickness) of the ultraviolet transmission inhibition layer 42 of the outer wall 40 is set constant, but the plate thickness (layer thickness) of the ultraviolet transmission inhibition layer 42 may also be varied. For example, as shown in part A of FIG. 8, the plate thickness (layer thickness) of the sections of the ultraviolet transmission inhibition layer 42 corresponding to the first inner layer 46 and the second inner layer 48 may also be set thicker than the plate thickness (layer thickness) of other sections (part A of FIG. 8 shows an example where the plate thickness of the section of the ultraviolet transmission inhibition layer 42 corresponding to the second inner layer 48 is made thicker than the plate thickness of other sections).

Furthermore, in the embodiment and in the modification example, the outer wall 40 is formed in such a way as to swell a little convexly obliquely forward and rightward as seen in a plan sectional view, but the shape of the outer wall 40 is not limited to this. For example, as shown in part B of FIG. 8, the vehicle width direction inner end portion and the vehicle width direction outer end portion of the outer wall 40 may also be formed in a stepped way in correspondence, for example, to the design of the automobile V (part B of FIG. 8 shows an example where a step portion is formed in the vehicle width direction inner end portion of the outer wall 40). Moreover, in this case also, the plate thickness (layer thickness) of the ultraviolet transmission inhibition layer 42 may also be varied in the same way as described above.

Furthermore, in the embodiment and in the modification example, the reinforcement beams 56 are formed in the outer wall 40, but reinforcement beams may also be formed in the inner wall 50 like in the outer wall 40. That is, reinforcement beams that bridge the vehicle width direction inner end portion 50A and the vehicle width direction outer end portion 50B of the inner wall 50 may also be formed inside the inner transparent portion 50C of the inner wall 50. In this case, like in the embodiment, the inner transparent portion 50C may be configured by a transparent resin material that inhibits the transmission of infrared radiation. Or, like in the modification example, the front face and the upper face of each reinforcement beam may be covered by an infrared transmission inhibition layer that inhibits the transmission of infrared radiation.

Furthermore, in the embodiment and in the modification example, the pillar member 32 is formed as a hollow pillar, but the pillar member 32 may also be formed as a solid pillar. In this case, for example, the section inside the closed cross section 34 may be made of the same material as that of the inner transparent portion 50C of the inner wall 50.

Furthermore, in the embodiment, an example was described where the vehicle pillar structure S is applied to the front pillar 30 on the driver's seat side, but the application of the vehicle pillar structure S is not limited to this. For example, the vehicle pillar structure S may also be applied to the front pillar 30 on the front passenger seat side. Furthermore, for example, although the drawings do not show this, the vehicle pillar structure S may also be applied to a rear pillar disposed between a rear windshield glass disposed in the rear portion of the cabin C and a side door glass disposed in the side portion of the cabin C. In this case, the rear pillar has a configuration where the configurations of the front pillar 30 are front-and-back reversed. Furthermore, for example, although the drawings do not show this, the vehicle pillar structure S may also be applied to a center pillar disposed between the front pillar 30 and the rear pillar.

Furthermore, in the embodiment, the vehicle pillar structure S is applied to the automobile V with right-side steering wheel, but the vehicle pillar structure S may also be applied to an automobile with left-side steering wheel.

What is claimed is:

1. A vehicle pillar structure comprising:
   a pillar member configuring a skeleton of a vehicle;
   a reinforcement member disposed inside the pillar member, bridging a pair of side portions of the pillar member, and reinforcing the pillar member; and
   an infrared transmission inhibition member, the infrared transmission inhibition member covering the reinforcement member at least from a design surface side of the pillar member and inhibiting transmission of infrared radiation.

2. The vehicle pillar structure according to claim 1, wherein the infrared transmission inhibition member covers the reinforcement member from a vehicle upper side in addition to the design surface side of the pillar member.

3. The vehicle pillar structure according to claim 1, wherein:
   the pillar member has an ultraviolet transmission inhibition member that inhibits transmission of ultraviolet radiation, and
   the ultraviolet transmission inhibition member configures the design surface of the pillar member.

4. The vehicle pillar structure according to claim 3, wherein the infrared transmission inhibition member is also disposed between the pair of side portions and the ultraviolet transmission inhibition member.

5. The vehicle pillar structure according to claim 4, wherein the infrared transmission inhibition member interconnects the pair of side portions, and the reinforcement member is embedded in the infrared transmission inhibition member.

6. The vehicle pillar structure according to claim 4, wherein:
   the ultraviolet transmission inhibition member interconnects the pair of side portions, and
   the reinforcement member covered by the infrared transmission inhibition member is embedded in the ultraviolet transmission inhibition member.

7. The vehicle pillar structure according to claim 1, wherein the infrared transmission inhibition member is placed adjacent to the design surface side of the pillar member.

* * * * *